(12) United States Patent
Hosaka et al.

(10) Patent No.: US 9,450,266 B2
(45) Date of Patent: Sep. 20, 2016

(54) BIPOLAR SECONDARY BATTERY

(75) Inventors: Kenji Hosaka, Yokohama (JP); Shiho Inoue, Yokohama (JP); Masaaki Suzuki, Yokosuka (JP); Kazuki Miyatake, Yokohama (JP)

(73) Assignee: NISSAN MOTOR CO., LTD., Yokohama-Shi (JP)

( * ) Notice: Subject to any disclaimer, the term of this patent is extended or adjusted under 35 U.S.C. 154(b) by 496 days.

(21) Appl. No.: 13/698,173

(22) PCT Filed: May 17, 2011

(86) PCT No.: PCT/JP2011/061300
§ 371 (c)(1),
(2), (4) Date: Nov. 15, 2012

(87) PCT Pub. No.: WO2011/145608
PCT Pub. Date: Nov. 24, 2011

(65) Prior Publication Data
US 2013/0059179 A1    Mar. 7, 2013

(30) Foreign Application Priority Data

May 19, 2010   (JP) ................. 2010-115113

(51) Int. Cl.
*H01M 10/04*   (2006.01)
*H01M 2/02*    (2006.01)
*H01M 2/26*    (2006.01)
*H01M 10/0585* (2010.01)
*H01M 2/34*    (2006.01)

(52) U.S. Cl.
CPC ....... *H01M 10/0418* (2013.01); *H01M 2/0207* (2013.01); *H01M 2/266* (2013.01); *H01M 2/345* (2013.01); *H01M 10/0585* (2013.01); *H01M 2/34* (2013.01)

(58) Field of Classification Search
CPC ...... H01M 2/34; H01M 2/345; H01M 2/348; H01M 10/0418
USPC .......................................................... 429/61
See application file for complete search history.

(56) References Cited

U.S. PATENT DOCUMENTS 6,524,741 B1   2/2003  Bryan
6,632,538 B1  10/2003  Yamazaki et al.
7,759,005 B2   7/2010  Hosaka et al.
(Continued)

FOREIGN PATENT DOCUMENTS

CN      1897345 A     1/2007
EP    1 291 934 A2    3/2003
(Continued)

*Primary Examiner* — Nicholas P D'Aniello
(74) *Attorney, Agent, or Firm* — Foley & Lardner LLP (57) ABSTRACT

A battery main body housed in a case comprises one laminated body composed of a plurality of bipolar electrodes laminated with an electrolyte layer therebetween or comprises a plurality of laminated bodies connected in series. A positive electrode current collecting plate and a negative electrode current collecting plate each having one surface joined to the inner peripheral surface of the case and the other surface joined to one end of the battery main body respectively extend to the outside of the case. By providing a cutoff mechanism for cutting off an electrical connection between the positive electrode current collecting plate and the negative electrode current collecting plate via the battery main body according to an expansion deformation of the case, a current path in a bipolar secondary battery is interrupted when the short-circuit current occurs, thereby protecting the bipolar secondary battery from a short-circuit current.

7 Claims, 8 Drawing Sheets (56) References Cited

U.S. PATENT DOCUMENTS

| | | |
|---|---|---|
| 2001/0038938 A1 | 11/2001 | Takahashi et al. |
| 2003/0049527 A1 | 3/2003 | Yageta et al. |
| 2007/0015047 A1 | 1/2007 | Hosaka et al. |
| 2007/0269714 A1 | 11/2007 | Watanabe et al. |
| 2008/0217078 A1* | 9/2008 | Kobayashi et al. ......... 180/65.1 |

FOREIGN PATENT DOCUMENTS

| | | |
|---|---|---|
| EP | 1 970 979 A1 | 9/2008 |
| JP | 2002-8629 A | 1/2001 |
| JP | 2003-208885 A | 7/2003 |
| JP | 2003-288883 A | 10/2003 |
| JP | 2004-7919 A | 1/2004 |
| JP | 2004-327047 A | 11/2004 |
| JP | 2005-44523 A | 2/2005 |
| JP | 2007-265753 A | 10/2007 |
| JP | 2007-311264 A | 11/2007 |
| JP | 2008-140638 A | 6/2008 |
| JP | 2008-226807 A | 9/2008 |
| JP | 2009-252548 A | 10/2009 |
| JP | 2002-8629 A | 1/2011 |

* cited by examiner

BIPOLAR SECONDARY BATTERY

FIELD OF THE INVENTION

This invention relates to protection of a bipolar secondary battery from a short-circuit current.

FIELD OF THE INVENTION

JP2009-252548A published by the Japan Patent Office in 2009 makes a proposal on a fluidity sealant used in a bipolar secondary battery such as a lithium-ion battery composed of a plurality of laminated layers of cells.

A positive electrode active material is arranged at one end of a lamination direction of the cells and a negative electrode active material is arranged at another end. The fluidity sealant is arranged around electrolytes so that the electrolytes of the cells are not degraded due to moisture in the air, and functions to block the cells from the air.

A fluidity sealant such as paraffin undergoes electrolysis under a high voltage. The electrolyzed fluidity sealant can no longer keep a required insulation property. The prior art technology realizes an electrolysis resistant structure by dividing the fluidity sealant into a plurality of sealed layers to prevent the application of a high voltage to the fluidity sealant.

SUMMARY OF THE INVENTION

If an external circuit connected to a bipolar secondary battery is shorted, a short-circuit current continues to flow in the battery and the battery produces heat.

The bipolar secondary battery according to the prior art technology produces an effect of preventing a high voltage load on the fluidity sealant even in such a situation, but does not act to interrupt a short-circuit current and prevent the battery from generating heat.

It is therefore an object of this invention to protect a bipolar secondary battery from a short-circuit current.

In order to achieve the above object, a bipolar secondary battery according to this invention comprises a battery main body, a case for housing the battery main body inside, a positive electrode current collecting plate having one surface joined to an inner peripheral surface of the case and another surface joined to one end of the battery main body and extending to an outside of the case and a negative electrode current collecting plate having one surface joined to the inner peripheral surface of the case and another surface joined to another end of the battery main body and extending to the outside of the case.

The battery main body comprises one laminated body or a plurality of laminated bodies connected in series. The laminated body is formed by laminating a plurality of bipolar electrodes and electrolyte layers alternately. Each of the bipolar electrodes comprises a plate-like current collector, a positive electrode active material layer arranged on one surface of the current collector and a negative electrode active material layer arranged on another surface of the current collector, The bipolar secondary battery further comprises a cutoff mechanism for cutting off an electrical connection between the positive electrode current collecting plate and the negative electrode current collecting plate via the battery main body according to an expansion deformation of the case.

The details as well as other features and advantages of this invention are set forth in the remainder of the specification and are shown in the accompanying drawings.

DESCRIPTION OF THE PREFERRED EMBODIMENTS

Figure 1:
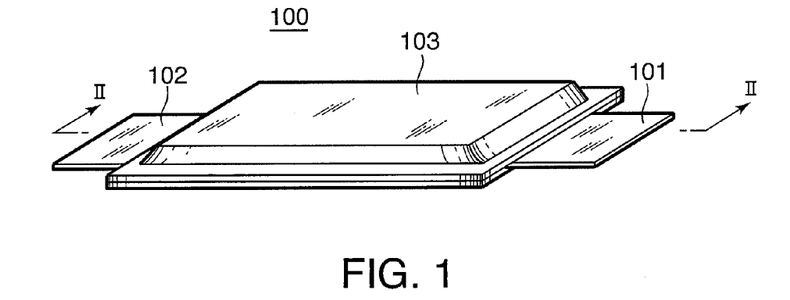
FIG. 1 is a perspective view of a bipolar secondary battery according to this invention.

Referring to FIG. 1 of the drawings, a bipolar secondary battery 100 comprises a case 103 having a substantially rectangular horizontal section and a positive electrode current collecting plate 101 and a negative electrode current collecting plate 102 taken out from the inside of the case 103 through two opposite sides of the case 103.

Figure 2:
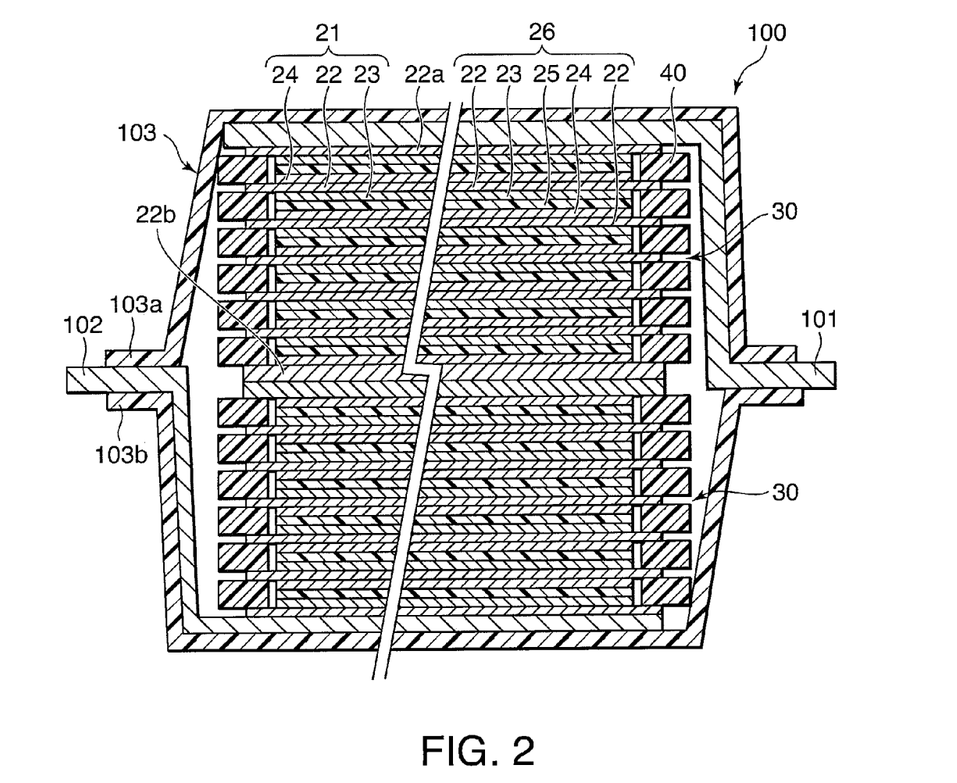
FIG. 2 is a longitudinal sectional view of the bipolar secondary battery taken along a line II-II in FIG. 1.

Referring to FIG. 2, the bipolar secondary battery 100 comprises a battery main body 300 inside the case 103. The battery main body 300 is formed by connecting two laminated bodies 30, in which a plurality of cells 26 is laminated, in series. The positive electrode current collecting plate 101 and the negative electrode current collecting plate 102 are respectively joined to the inner peripheral surface of the case 103 while sandwiching the battery main body 300. More specifically, the positive electrode current collecting plate 101 and the negative electrode current collecting plate 102 are fixed to the inner peripheral surface of the case 103 by bonding.

The case 103 functions to shut off the battery main body 300 from ambient air, thereby protecting the battery main body 300. The case 103 is composed of a pair of case members 103a and 103b. Each of the case members 103a, 103b comprises a recessed portion for housing the battery main body 300 and a flange portion surrounding the recessed portion.

The case 103 is integrally formed by welding the flange portions of the pair of case members 103a and 103b while sandwiching the positive electrode current collecting plate 101 and the negative electrode current collecting plate 102 extending from the inside of the case 103 to the outside thereof. The case 103 is made of a sheet-like material having such strength as not to damage the laminated bodies 30 against a pressure difference produced between the inside and the outside of the case 103 while having deformable flexibility. It is desirable that the sheet-like material does not allow electrolytic solutions and gases to permeate, has an electrical insulation property and is chemically stable against materials such as electrolytic solutions.

Preferably, a laminated film, polyethylene, polypropylene, polycarbonate or the like is used as the sheet-like material. The laminated film is such that a metal foil of a metal including an alloy of aluminum, stainless steel, nickel, copper or the like is covered with an insulating synthetic resin film such as a polypropylene film.

The cell 26 constituting the laminated body 30 is composed of an electrolyte layer 25, a positive electrode active material layer 23 and a negative electrode active material layer 24 laminated on opposite sides of the electrolyte layer 25, and plate-like current collectors 22 laminated on the outer sides of the positive electrode active material layer 23 and the negative electrode active material layer 24 in a lamination direction. It should be noted that, when laminating the plurality of cells 26 as shown in the figure, only one current collector 22 is sandwiched between the adjacent cells 26.

A known material is used for the current collector 22. For example, aluminum or stainless steel (SUS) can be used. The material of the current collector 22 may contain a polymer material. That is, polyolefin (polypropylene, polyethylene), polyester (PET, PEN), polyimide, polyamide and polyvinylidene fluoride (PVdF) can be used. To provide these polymer materials with electrical conductivity, particles of carbon such as Ketjen Black, acetylene black or carbon black or of a metal such as aluminum (Al), copper (Cu), stainless steel (SUS) or titanium (Ti) are preferably dispersed in the polymer material.

The positive electrode active material layer 23 comprises a positive electrode active material and can further comprise a conductive assistant, a binder, etc. A complex oxide of a transition metal and lithium used in a solution lithium-ion battery may be used as the positive electrode active material.

The negative electrode active material layer 24 comprises a negative electrode active material and can further comprise a conductive assistant, a binder, etc. A negative electrode active material used in a solution lithium-ion battery may be used as the negative electrode active material.

Particularly, it is possible to form a battery with excellent capacity and output characteristic by using a lithium-transition metal complex oxide as the positive electrode active material of the positive electrode active material layer 23 and using a carbon or lithium-transition metal complex oxide as the negative electrode active material of the negative electrode active material layer 24.

The electrolyte layer 25 is a layer or a liquid electrolyte including an ion-conducting polymer. In this embodiment, a polymer gel electrolyte obtained by impregnating a separator as a base material with a pre-gel solution and then applying chemical crosslinking or physical crosslinking is used as the electrolyte. An electrolytic solution included in the electrolyte contains an organic solvent such as polyprene carbonate, ethylene carbonate or diethyl carbonate, and boils and gasifies with an increase in temperature. In this embodiment, a melting point of the separator is about 120° C. A boiling point of the electrolytic solution is about 140° C.

The outer periphery of the cell 26 is covered by a seal portion 40. The seal portion 40 is filled between outer peripheral parts of the adjacent current collectors 22 and blocks the contact of the positive electrode active material layer 23, the electrolyte layer 25 and the negative electrode active material 24 with ambient air. The seal portion 40 prevents a reduction in the ion-conductivity of the electrolyte by sealing the cell 26. Further, in the case where a liquid or semisolid gel is used for the electrolyte, the seal portion 40 prevents a short circuit that may be caused by a leaked liquid or gel.

A thermally fusible resin such as a rubber-based resin which adheres to the current collector 22 by being pressed and deformed or an olefin-based resin which adheres to the current collector 22 by being thermally fused through heating and pressing can be used as a seal precursor.

The rubber-based resin is not particularly limited, but preferably selected from a group including silicon-based rubber, fluorine-based rubber, olefin-based rubber and nitrile-based rubber. These rubber-based resins are excellent in sealing performance, alkali resistance, chemical resistance, durability, weather resistance, heat resistant, etc. and these excellent properties and qualities can be maintained for a long period of time under the use environments of secondary batteries.

The thermally fusible resin should also have an excellent sealing performance under every use environment of the laminated body 30. Preferably, it is selected from silicon, epoxy, urethane, polybutadiene, olefin-based resin (polypropylene, polyethylene, etc.) and paraffin wax, for example. These thermally fusible resins are excellent in sealing performance, alkali resistance, chemical resistance, durability, weather resistance, heat resistant, etc. and these excellent properties and qualities last for a long period of time under the use environments of secondary batteries.

In a production process of the laminated body 30, a plurality of bipolar electrodes 21 in each of which the positive electrode active material layer 23 is formed on one surface of the current collector 22 and the negative electrode active material 24 is formed on the other surface and a plurality of electrolyte layers 25 are alternatively laminated over six layers. A positive electrode current collector 22a and a negative electrode current collector 22b are laminated on opposite ends of the laminated body 30 in the lamination direction. Different from the current collector 22, the positive electrode active material layer 23 is formed on one surface of the positive electrode current collector 22a, but nothing is formed on the other surface thereof. The negative electrode active material 24 is formed on one surface of the negative electrode current collector 22b, but nothing is formed on the other surface thereof. The positive electrode current collector 22a is laminated with the positive electrode active material layer 23 held in contact with the electrolyte layer 25. The negative electrode current collector 22b is laminated with the negative electrode active material 24 held in contact with the electrolyte layer 25.

A predetermined number of cells 26 laminated as described above are thermally pressed using a thermal press machine so that the seal portions 40 have a predetermined thickness, and the uncured seal portions 40 are further cured, whereby the bipolar laminated body 30 is completed.

The battery main body 300 is composed of the two laminated bodies 30 arranged in series such that the positive electrode current collector 22a of one laminated body 30 is held in contact with the negative electrode current collector 22b of the other laminated body 30.

The positive electrode current collecting plate 101 and the negative electrode current collecting plate 102 function to take out a current from the case 103 of the battery main body 300 or supply a current to the battery main body 300 from the outside of the case 103. Materials for the positive electrode current collecting plate 101 and the negative electrode current collecting plate 102 are not particularly limited and known materials can be used. Preferably, aluminum, stainless steel (SUS), a polymer material and the like are used.

The adjacent positive electrode current collector 22a and negative current collector 22b of the two laminated bodies 30 constituting the battery main body 300 are bonded by a conductive adhesive. Further, the positive electrode current collector 22a located at one end of the battery main body 300 and the positive electrode current collecting plate 101 are also bonded by the conductive adhesive. The negative electrode current collector 22b located at the other end of the battery main body 300 and the negative electrode current collecting plate 102 are also bonded by the conductive adhesive. Any one of a butyl rubber-based conductive double-sided adhesive tape having a peel strength of 120%, an acrylic-based conductive double-sided adhesive tape having a peel strength of 100% and a conductive epoxy adhesive having a peel strength of 90% is used as the adhesive.

Further, the positive electrode current collecting plate 101 is joined to the inner peripheral surface of the case member 103a and the negative electrode current collecting plate 102 is joined to the inner peripheral surface of the case member 103b by bonding using an adhesive. A butyl rubber-based double-sided adhesive tape having a peel strength of 120% or an acrylic-based double-sided adhesive tape having a peel strength of 100% is used for bonding.

Each peel strength expresses the peel strength of each adhesive in percentage when the peel strength of the acrylic-based double-sided adhesive tape is 100%.

It is not an essential requirement to bond the positive electrode current collector 22a and the negative electrode current collector 22b of the two laminated bodies 30 and these may be merely held in contact without being bonded.

In the bipolar secondary battery 100 according to this invention, the above bonding is so performed as to satisfy the following conditions.

Providing that K4 denotes the peel strength between the positive electrode current collector 22a and the negative electrode current collector 22b of the two laminated bodies 30, K3 denotes the peel strength between the positive electrode current collector 22a and the positive electrode current collecting plate 101, K5 denotes the peel strength between the negative electrode current collector 22b and the negative electrode current collecting plate 102, K1 denotes the peel strength between the positive electrode current collecting plate 101 and the case 103 and K2 denotes the peel strength between the negative electrode current collecting plate 102 and the case 103, any of the following conditions should be satisfied K1,K2>K3 or K1,K2>K4 or

K1,K2>K5.

It should be noted that the peel strength K4 equals zero when the positive electrode current collector 22a and the negative electrode current collector 22b of the two laminated bodies 30 are not adhered.

The above relationship is expressed by the following sentence. Specifically, the peel strength between the inner peripheral surface of the case 103 and the positive electrode current collecting plate 101 and the peel strength between the inner peripheral surface of the case 103 and the negative electrode current collecting plate 102 are both higher than at least one of the peel strength between the positive electrode current collecting plate 101 and the positive electrode current collector 22a, the peel strength between the negative electrode current collecting plate 102 and the negative electrode current collector 22b and the peel strength between the positive electrode current collector 22a and the negative electrode current collector 22b between the laminated bodies 30.

The bipolar secondary battery 100 is completed by fusing the flange-like outer peripheral parts of the pair of case members 103a, 103b constituting the case 103 in a vacuum state after the above process. The interior of the case 103 may be left in a vacuum state by fusing the outer peripheral parts of the case members 103a, 103b excluding parts thereof and sucking air in the case 103 through an unfused part.

In a hybrid electric vehicle (HEV) or an electric vehicle (EV), various electrical circuits, which operate on power supplied from a vehicle-mounted battery, may experience a trouble when a strong impact is applied to a vehicle body. If power continues to be supplied from the battery to the faulty circuit, an excessive current flows into the faulty circuit, the circuit produces heat and a high-current line may be shorted. High-current lines in the vehicle-mounted battery may also be shorted to each other.

In such a case, an excessive short-circuit current flows in the bipolar secondary battery 100 and the temperature of the bipolar secondary battery 100 increases due to heat generation caused by an internal resistance of the bipolar secondary battery 100. If an organic solvent such as polyprene carbonate, ethylene carbonate or diethyl carbonate included in the electrolytic solution of the electrolyte layers 25 of the laminated bodies 30 boils and gasifies with this increase in temperature, an internal pressure of the case 103 increases and the case 103 expands.

The expansion of the case 103 exerts a tensile load on the two laminated bodies 30 via the positive electrode current collecting plate 101 and the negative electrode current collecting plate 102 bonded to the inner peripheral surface of the case 103.

This tensile load acts as a peel force not only between the inner peripheral surface of the case 103 and the positive electrode current collecting plate 101 and between the inner peripheral surface of the case 103 and the negative electrode current collecting plate 102, but also between the positive electrode current collector 22a and the negative electrode current collector 22b of the two laminated bodies 30, between the positive electrode current collector 22a located at the one end of the battery main body 300 and the positive electrode current collecting plate 101 and between the negative electrode current collector 22b located at the other end of the battery main body 300 and the negative electrode current collecting plate 102.

In this bipolar secondary battery 100, the peel strength between the inner peripheral surface of the case 103 and the positive electrode current collecting plate 101 and the peel strength between the inner peripheral surface of the case 103 and the negative electrode current collecting plate 102 are both set to be higher than at least one of the peel strength between the positive electrode current collector 22a at the one end of the battery main body 300 and the positive electrode current collecting plate 101, the peel strength between the negative electrode current collector 22b at the other end of the battery main body 300 and the negative electrode current collecting plate 102 and the peel strength between the positive electrode current collector 22a and the negative electrode current collector 22b of the two laminated bodies 30.

Thus, by the action of the peel force, any one pair of the positive electrode current collecting plate 101 and the positive electrode current collector 22a, the negative electrode current collecting plate 102 and the negative electrode current collector 22b, the positive electrode current collector 22a and the negative electrode current collector 22b of the two laminated bodies 30 constituting the battery main body 300 are peeled off from each other. The contact between these peeled members is weakened, whereby the flow of the short-circuit current is suppressed. Further, when the members are completely peeled off from each other, the short-circuit current is interrupted.

In this way, according to this invention, the bipolar secondary battery 100 is protected from a short-circuit current from the external circuit connected to the bipolar secondary battery 100.

In this embodiment, each laminated body 30 is composed of six cells and the battery main body 300 is constructed by connecting the two laminated bodies 30 in series. However, the number of the cells 26 constituting the laminated body 30 and the number of the laminated bodies 30 connected in series can be arbitrarily set according to a voltage and a capacity required for the bipolar secondary battery 100.

Accordingly, the battery main body 300 may be, for example, composed of a single laminated body 30 so that there is no connecting part between the laminated bodies 30. In such a case, the peel strength between the inner peripheral surface of the case 103 and the positive electrode current collecting plate 101 and the peel strength between the inner peripheral surface of the case 103 and the negative electrode current collecting plate 102 may be both set to be higher than at least one of the peel strength between the positive electrode current collecting plate 101 and the positive electrode current collector 22a at the one end of the battery main body 300 and the peel strength between the negative electrode current collecting plate 102 and the negative electrode current collector 22b at the other end of the battery main body 300.

Figure 3:
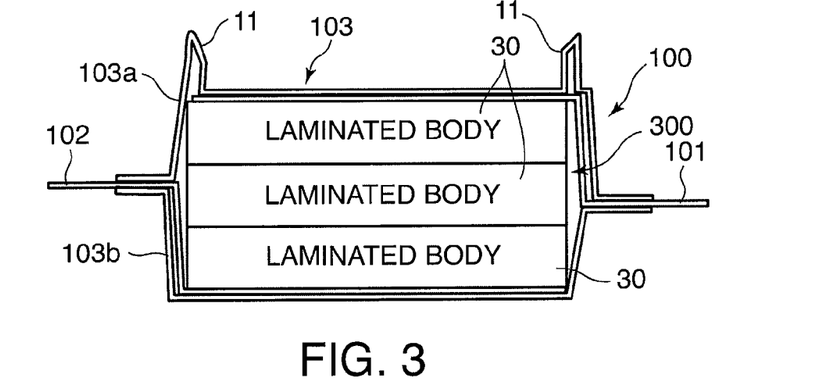
FIG. 3 is a schematic longitudinal sectional view of a bipolar secondary battery according to a second embodiment of this invention.
Figure 4:
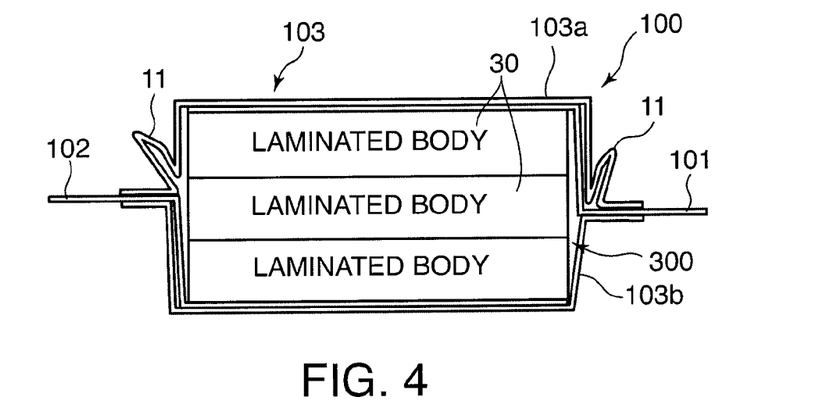
FIG. 4 is similar to FIG. 3, but shows a variation relating to folded portions.
Figure 5:
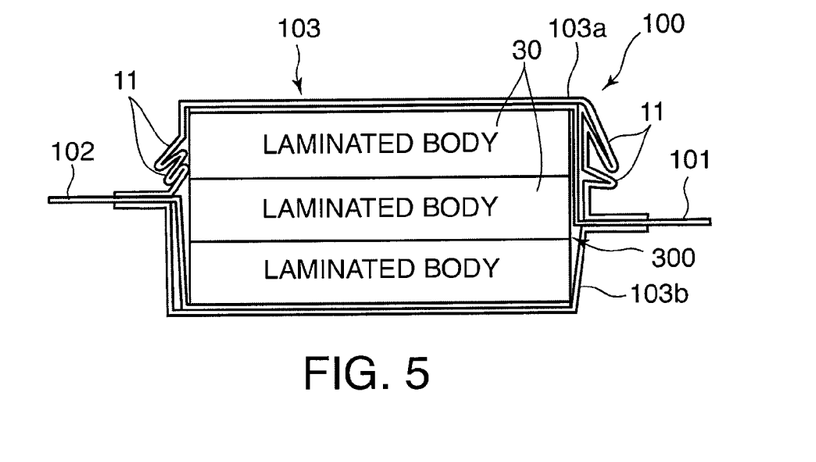
FIG. 5 is similar to FIG. 3, but shows another variation relating to the folded portions.

Referring to FIGS. 3-5, a second embodiment of this invention will be described. It should be noted that essential parts in these figures are drawn in a deformed manner to clearly show characteristics.

In the first embodiment, the bipolar secondary battery 100 is so structured that the peel force is generated exclusively by the thermal expansion of the case 103. In this embodiment, one case member 103a constituting a case 103 is provided with folded portions 11 as an allowance for elongation of the case 103 so that the case 103 expands in a lamination direction of cells 26 according to a gas pressure increase in the case 103.

Referring to FIG. 3, the folded portion 11 is formed into a cylindrical shape projecting in a direction away from a battery main body 300 from an end surface of the case member 103a in the lamination direction of the cells 26. The projecting end is then folded back by substantially 180° to form a crest portion. The folded portion 11 facilitates an expansion deformation of the case 103 by displacing the end surface of the case member 103a at the inner side of the folded portion 11 in the direction away from the battery main body 300 according to an increase in the internal pressure of the case 103.

The configuration of a bipolar secondary battery 100 other than the case 103 is the same as in the first embodiment, including the setting of peel strengths. The expansion of the case 103 in response to an internal pressure increase is facilitated by this embodiment. As a result, when the internal pressure of the case 103 increases, the peeling of any one of the pairs of a positive electrode current collecting plate 101 and a positive electrode current collector 22a at one end of the battery main body 300, a negative electrode current collecting plate 102 and a negative electrode current collector 22b at the other end of the battery main body 300 and a positive electrode current collector 22a and a negative electrode current collector 22b between two laminated bodies 30 constituting the battery main body 300 is promoted.

Thus, the bipolar secondary battery 100 can be more quickly and more reliably protected against a short-circuit current caused by an external circuit.

Various variations are possible for the formation position and the number of the folded portion 11.

Referring to FIG. 4, a folded portion 11 including a crest portion is provided over 360° on the outer peripheral surface of the one case member 103a of the case 103 with respect to the lamination direction of the cells 26.

Referring to FIG. 5, two folded portions 11 including a crest portion are provided over 360° on the outer peripheral surface of the one case member 103a of the case 103 with respect to the lamination direction of the cells 26.

Regardless of the formation position and the number of the folded portion(s) 11, if a short-circuit current flows into the bipolar secondary battery 100 to increase the temperature of the battery and the internal pressure of the case 103, the case 103 thus constructed to expand and contract is easily expanded in the lamination direction of the cells 26. Preferably, the case 103 is easily deformable without being destroyed at an internal pressure of 0.1 to 10 kg/cm² (≅kilopascal (kPa)). If the case 103 is easily deformed at such an internal pressure, the positive electrode current collecting plate 101 or the negative electrode current collecting plate 102 and the battery main body 300, or the two laminated bodies 30 constituting the battery main body 300 can be easily separated.

That is, if an excessive short-circuit current flows through the external circuit connected to the bipolar secondary battery 100, the temperature of the bipolar secondary battery 100 increases and the electrolytic solution included in the electrolyte layer 25 of each cell 26 boils. The internal pressure of the case 103 increases due to vapors of the organic solvents produced as the electrolytic solution boils, whereby the case 103 extends in the lamination direction of the cells 26, i.e. in a direction to extend the folded portion 11.

As the case 103 extends, the positive electrode current collecting plate 101 and the negative electrode current collecting plate 102 bonded to the case 103 by the adhesive having a high peel strength are displaced in directions separating from each other together with the case 103. This peel force acts between the positive electrode current collecting plate 101 and the positive electrode current collector 22a at the one end of the battery main body 300, between the negative electrode current collecting plate 102 and the negative electrode current collector 22b at the other end of the battery main body 300 and between the positive electrode current collector 22a and the negative electrode current collector 22b of the two laminated bodies 30 constituting the battery main body 300. Since a adhesive force bonding these parts is relatively low, separation occurs between any one of these pairs. As a result, the short-circuit current in the bipolar secondary battery 100 is interrupted.

Although the case member 103a is formed with the folded portion 11 in this embodiment, the case member 103b may be formed with the folded portion 11. Both the case member 103a and the case member 103b may be formed with the folded portion 11.

Referring to FIGS. 6-9, a third embodiment of this invention will be described. It should be noted that essential parts in FIGS. 6-9 are drawn in a deformed manner to clearly show characteristics.

Figure 6:
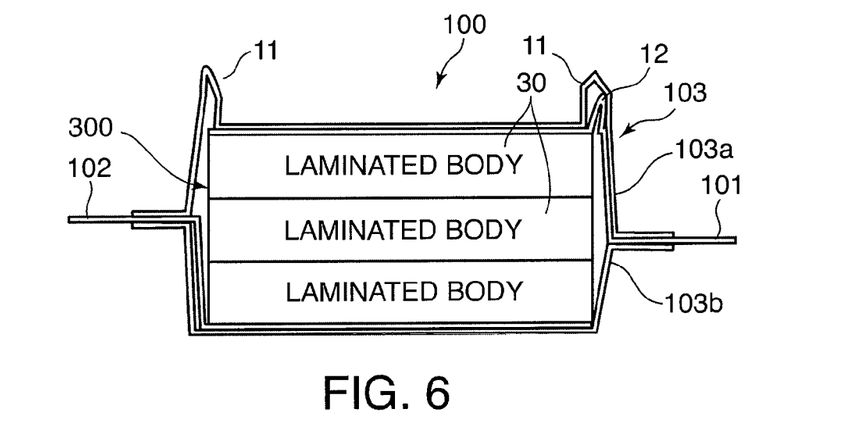
FIG. 6 is similar to FIG. 3, but shows a third embodiment of this invention.

Referring to FIG. 6, further to the configuration of the second embodiment, a length of the positive electrode current collecting plate 101 between a part adhered to the case member 103a and the battery main body 300 and a take-out portion according to this embodiment is set to be longer in advance.

Figure 7:
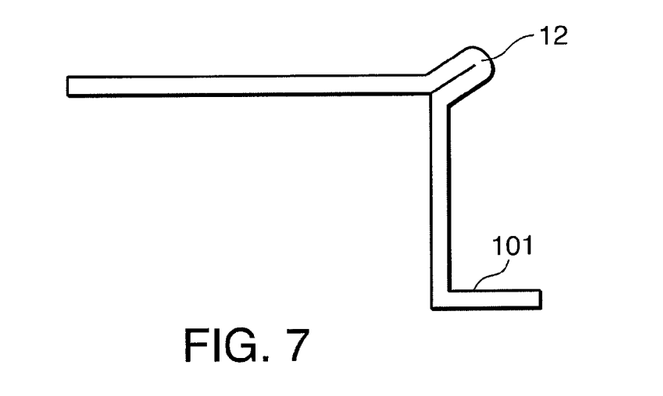
FIG. 7 is a longitudinal sectional view of a current collecting plate according to the third embodiment of this invention.

Referring to FIG. 7, specifically, a folded portion 12 is formed in the positive electrode current collecting plate 101 in the section between the part adhered to the case member 103a and the battery main body 300 and the take-out portion towards the outside of the case 103. Further, the location of the folded portion 12 is limited to a position corresponding to a corner part of the battery main body 300. Preferably, dimensions of the folded portion 12 are set such that a displaceable range of the positive electrode current collecting plate 101 by the folded portion 12 is equal to the range of expansion deformation of the case 103 by the folded portion 11.

The folded portion 12 is preferably provided at the inner side of the folded portion 11.

Figure 8:
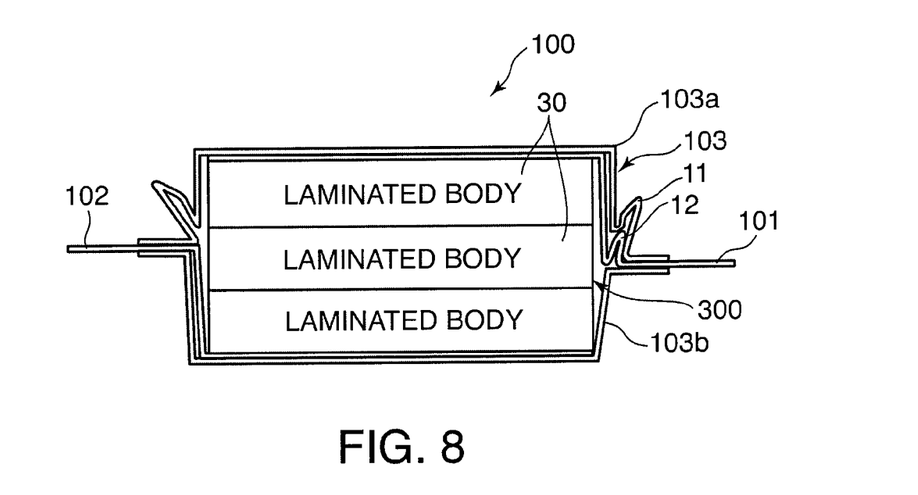
FIG. 8 is similar to FIG. 6, but shows a variation relating to folded portions.

Referring to FIG. 8, especially when the folded portion 11 is formed on the outer peripheral surface of the case member 103a, the folded portion 12 is preferably formed within the folded portion 11.

Figure 9:
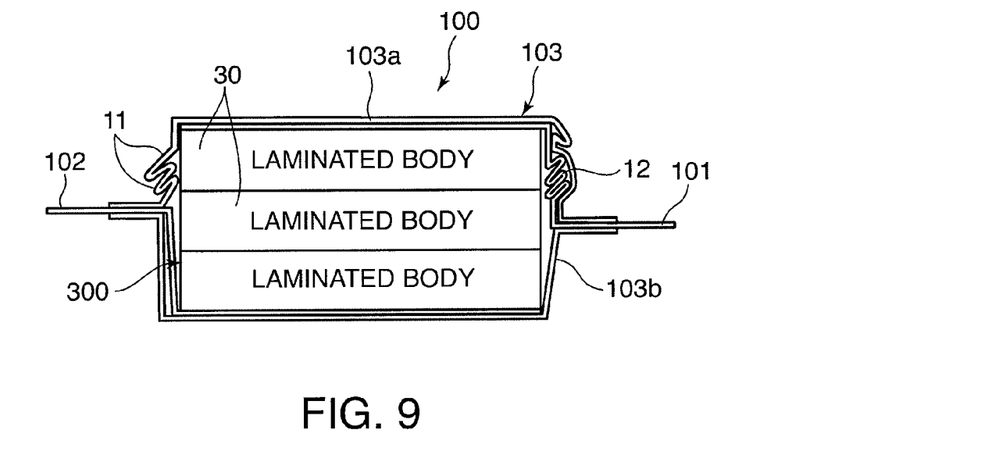
FIG. 9 is similar to FIG. 6, but shows another variation relating to the folded portions.

Referring to FIG. 9, when a plurality of folded portions 11 is formed on the outer peripheral surface of the case member 103a, a plurality of the folded portions 12 is preferably provided.

The other configuration of the bipolar secondary battery 100 according to this embodiment is the same as in the second embodiment.

In the second embodiment, there is a possibility that a displacement of the positive electrode current collecting plate 101 following an expansion deformation of the case 103 may be restrained due to the dimension of the positive electrode current collecting plate 101 in the lamination direction of the cells 26. According to this embodiment, however, the positive electrode current collecting plate 101 can be displaced easily, following an expansion deformation of the case 103, by providing the positive electrode current collecting plate 101 with the folded portion 12. The positive electrode current collecting plate 101 and the positive electrode current collector 22a at the one end of the battery main body 300, or the negative electrode current collecting plate 102 and the negative electrode current collector 22b at the other end of the battery main body 300, or the positive electrode current collector 22a and the negative electrode current collector 22b of the two laminated bodies 30 constituting the battery main body 300 can thereby be more reliably separated when an expansion deformation of the case 103 occurs.

Although the case member 103a is formed with the folded portion 11 and the positive electrode current collecting plate 101 is formed with the folded portion 12 in this embodiment, it is also possible to form the case member 103b with the folded portion 11 and form the negative electrode current collecting plate 102 with the folded portion 12. Further, it also possible to form both the case member 103a and the case member 103b with the folded portion 11 and form both the positive electrode current collecting plate 101 and the negative electrode current collecting plate 102 with the folded portion 12.

Figure 10:
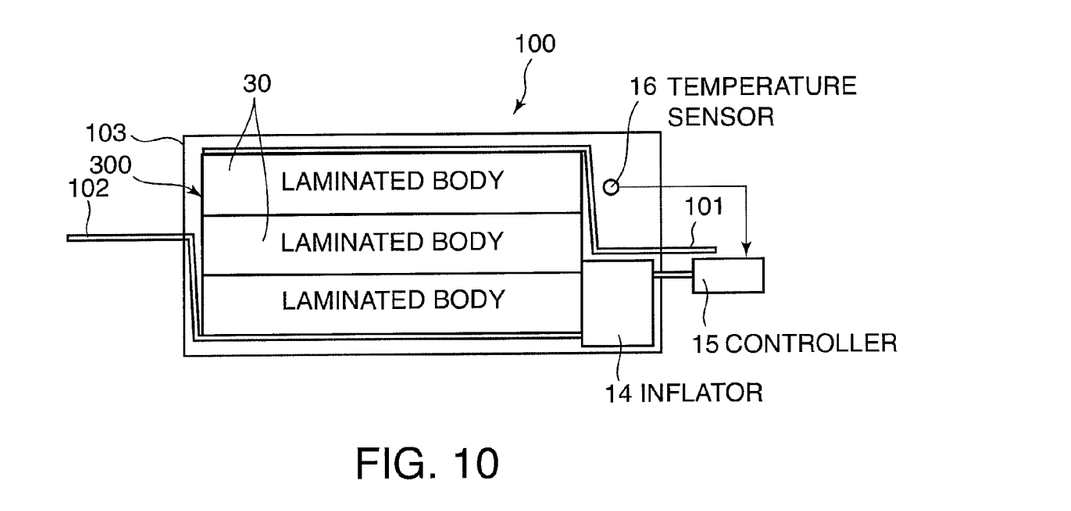
FIG. 10 is a schematic construction diagram including a schematic longitudinal sectional view of a bipolar secondary battery according to a fourth embodiment of this invention.

Referring to FIG. 10, a fourth embodiment of this invention will be described.

A bipolar secondary battery 100 according to this embodiment comprises an inflator 14 for producing gas inside a case 103.

The inflator 14 produces gas by chemical reaction. The inflator 14 comprises a built-in igniter, firelighter, gas-forming agent, etc. A controller 15 arranged outside the case 103 is connected to the inflator 14. The controller 15 actuates the igniter of the inflator 14 to ignite the firelighter and burn the gas-forming agent.

As another configuration relating to the inflator 14, it is also possible to include a built-in high-pressure container filled with high-pressure gas and a built-in actuator for opening the high-pressure container and release the gas in the high-pressure container by the controller 15 arranged outside the case 103 for actuating the actuator. A hybrid type inflator corresponding to a combination of the above two types of the inflator 14 may also be used.

A temperature sensor 16 for detecting a temperature of the laminated bodies 30 is connected to the controller 15. The controller 15 is constituted by a microcomputer including a central processing unit (CPU), a read only memory (ROM), a random access memory (RAM) and an input/output interface (I/O interface). The controller 15 is pre-programmed to actuate the inflator 14 when the temperature of the laminated bodies 30 becomes, for example, 100° C. or higher.

It is also possible to provide a current sensor for detecting a current in the positive electrode current collecting plate 101 or the negative electrode current collecting plate 102 instead of the temperature sensor 16 and program the controller 15 so as to actuate the inflator 14 when a detected current of the current sensor exceeds a short-circuit current equivalent value.

Further, it is possible to provide a voltage sensor for detecting a voltage difference between the positive electrode current collecting plate 101 and the negative electrode current collecting plate 102 instead of the temperature sensor 16 and program the controller 15 so as to actuate the inflator 14 when a detected voltage of the voltage sensor deviates from a voltage value equivalent to the one during a normal operation. The voltage value during the normal operation is, for example, 4.2 V to 2.5 V.

Furthermore, it is possible to provide a pressure sensor for detecting an internal pressure of the case 103 instead of the temperature sensor 16 and program the controller 15 so as to actuate the inflator 14 when the internal pressure of the case 103 becomes equal to or higher than a predetermined pressure.

Any of the above sensors is a sensor for detecting a parameter related to a short-circuit current in the bipolar secondary battery 100.

According to this embodiment, if a short-circuit current flows into the bipolar secondary battery 100, the inflator 14 operates to produce gas, whereby the case 103 is expanded by a gas pressure. As a result, the case 103 quickly extends and the positive electrode current collector 101 and the positive electrode current collector 22a at the one end of the battery main body 300, or the negative electrode current collector 102 and the negative electrode current collector 22b at the other end of the battery main body 300, or the positive electrode current collector 22a and the negative electrode current collector 22b of the two laminated bodies 30 constituting the battery main body 300 can be promptly separated.

Figure 16:
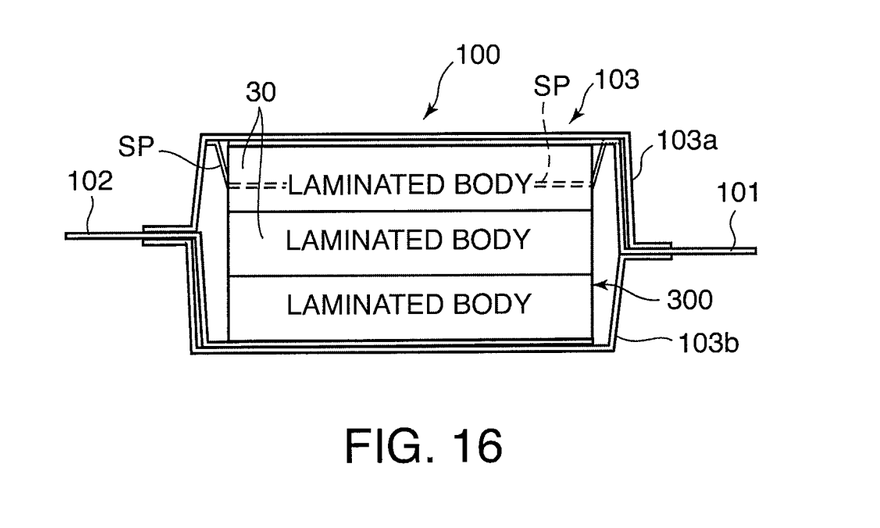
FIG. 16 is a longitudinal vertical sectional view of a bipolar secondary battery according to a fifth embodiment of this invention.
Figure 17:
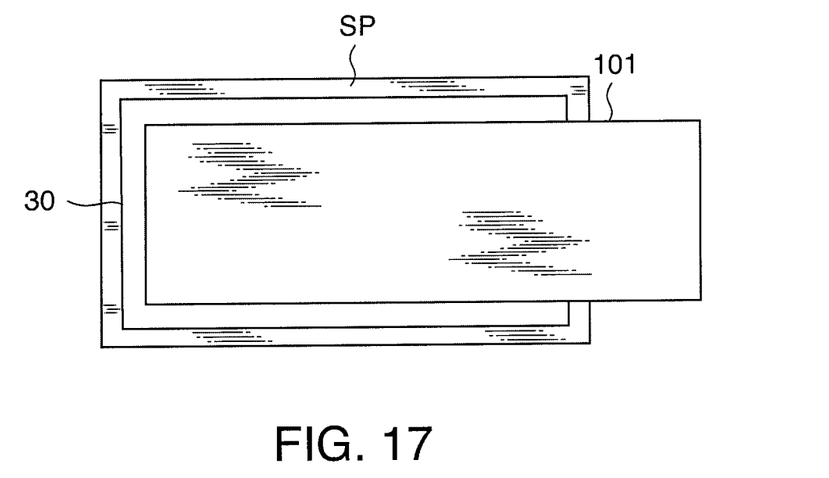
FIG. 17 is a plan view of an interior of the bipolar secondary battery according to the fifth embodiment of this invention.

Referring to FIGS. 16 and 17, a fifth embodiment of this invention will be described.

In this embodiment, a separator SP which is a base material of an electrolyte layer 25 of any one of cells 26 constituting a battery main body 300 is formed to be larger than external dimensions of the cell 26, and an outer peripheral part of the separator SP is fused to an end surface of a case member 103a inside a case 103.

To avoid interference with a positive electrode current collector 101, a cut-out for allowing the passage of the positive electrode current collecting plate 101 is formed in the outer peripheral part of the separator SP. The specification of the case 103 is the same as in the first embodiment.

As the case 103 undergoes an expansion deformation, a laminated body 30 including the separator SP whose outer peripheral part is fixed to the case member 103a is displaced integrally with the case member 103. As a result, a tensile load which acts on the battery main body 300 in association with the expansion deformation of the case 103 acts between this laminated body 30 and a negative electrode current collecting plate 102 fixed to a case member 103b in a concentrated manner, thereby promoting the peeling between the positive electrode current collector 22a and a negative electrode current collector 22b between the laminated bodies 30 or the peeling between the negative electrode current collecting plate 102 and the negative electrode current collector 22b at the other end of the battery main body 300.

Note that the separator SP may be fixed to an end surface of the case member 103b. Further, the separator SP fixed to the case member 103a or 103b may be included in any cell 26 of any laminated body 30.

Next, Referring to FIGS. 11A-11C, FIGS. 12A and 12B, FIGS. 13A and 13B, FIG. 14 and FIG. 15. an experiment conducted by the inventors on the manufacturing of the bipolar secondary battery 100 and a current interruption capability of the obtained product will be described First, the fabrication of a bipolar secondary battery will be described.

A positive electrode layer was prepared in the following manner. A positive electrode base including 85 weight percent (wt %) of LiMn$_2$O$_4$ as a positive electrode active material, 5 wt % of acetylene black as a conductive assistant and 10 wt % of polyvinylidene fluoride (PVdF) as a binder was prepared. By adding N-methylpyrrolidone (NMP) as a slurry viscosity adjusting solvent to the positive electrode base until a viscosity optimal for an application operation was reached, a positive electrode slurry was prepared.

Figure 11A:
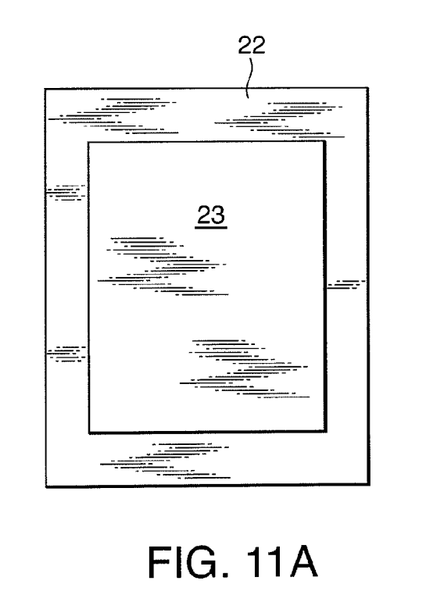
FIGS. 11A to 11C are a front view, a rear view and a longitudinal sectional view of a bipolar electrode according to this invention.

As shown in FIG. 11A, a positive electrode active material layer 23 of 30 μm was formed by applying the positive electrode slurry to one surface of a SUS foil having a thickness of 20 microns (μm) as a current collector 22 and by drying the positive electrode slurry.

Figure 11B:
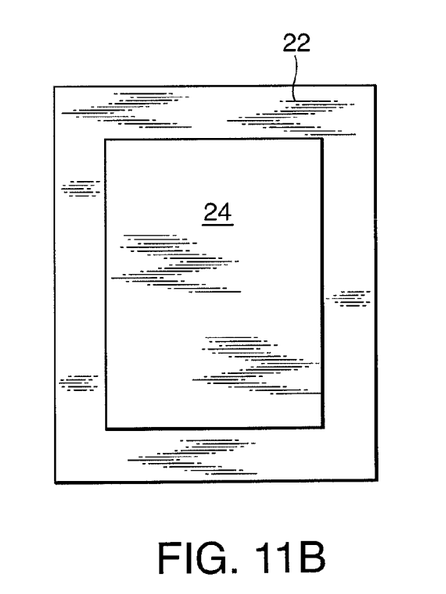

A negative electrode layer was prepared in the following manner. That is, a negative electrode base including 90 wt % of hard carbon as a negative electrode active material and 10 wt % of PVDF as a binder was prepared. By adding NMP as a slurry viscosity adjusting solvent to the negative electrode base until a viscosity optimal for an application operation was reached, a negative electrode slurry was prepared. As shown in FIG. 11B, a negative electrode active material layer 24 of 30 μm was formed by applying the negative electrode slurry to the opposite surface of the SUS foil as the current collector 22 having the positive electrode applied and by drying the negative electrode slurry.

Figure 11C:
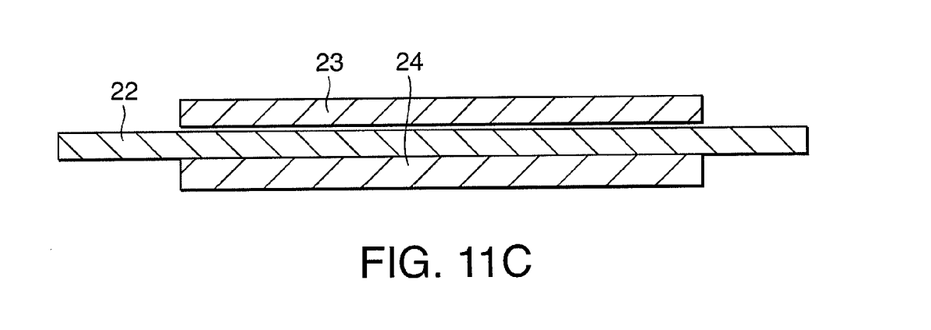

A base material of a bipolar electrode 21 was obtained by forming the positive electrode active material layer 23 and the negative electrode active material layer 24 on the opposite surfaces of the SUS foil as the current collector 22 as shown in FIG. 11C.

Subsequently, the base material is cut into a piece of 160×130 mm, and the surfaces of the SUS were exposed by peeling off an outer peripheral part having a width of 10 mm from each of the positive and negative electrodes. As a result, a structure of the bipolar electrode 21 was prepared which comprises electrode surfaces of 140×110 mm and the current collector 22 formed by the exposed SUS having a width of 10 mm at the outer peripheral side of the electrode surfaces.

Subsequently, an electrolyte base including 90 wt % of an electrolytic solution containing 1 moll of lithium hexafluorophosphate (LiPF6) in a mixed solvent of propylene carbonate-ethylene carbonate (PC-EC) and 10 wt % of PVdF-HFP including 10% of a hexafluoropropene (HFP) as a host polymer was prepared. By adding dimethyl carbonate (DMC) as a slurry viscosity adjusting solvent to the electrolyte base until a viscosity optimal for an application operation was reached, a pre-gel electrolyte was prepared. The bipolar electrode 21 soaked with a gel electrolyte was completed by applying this pre-gel electrolyte to the surfaces of the positive and negative electrode parts of the structure and drying the DMC.

Next, fabrication of a seal portion precursor will be described.

Figure 12A:
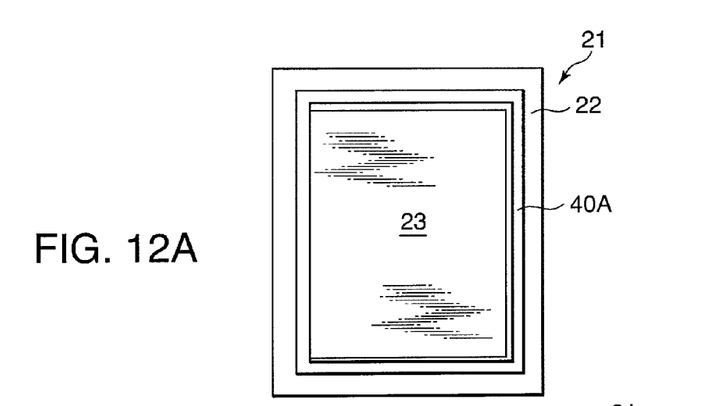
FIGS. 12A and 12B are a front view and a cross-sectional view of a bipolar electrode mounted with a seal precursor.
Figure 12B:
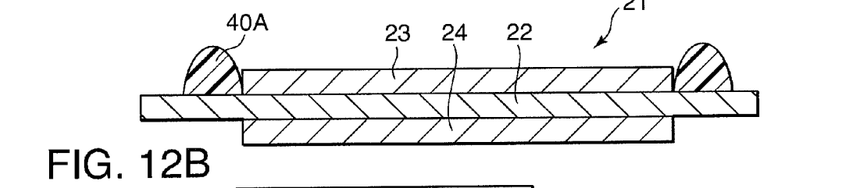

Referring to FIGS. 12A and 12B, a seal precursor 40A made of a one-part uncured epoxy resin was applied to the exposed part of the outer peripheral part of the positive electrode of the bipolar electrode 21 using a dispenser.

Figure 13A:
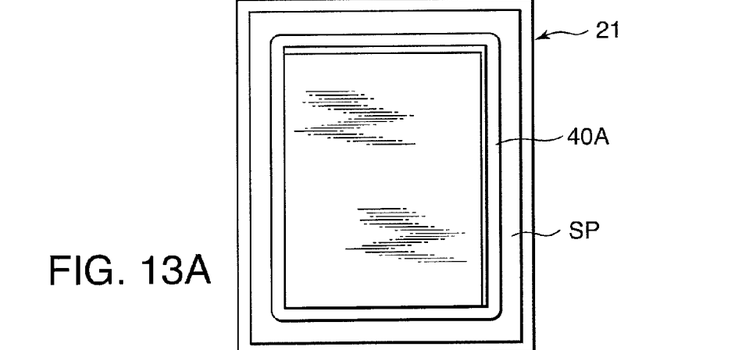
FIGS. 13A and 13B are a front view and a cross-sectional view of a bipolar electrode mounted with a separator.
Figure 13B:
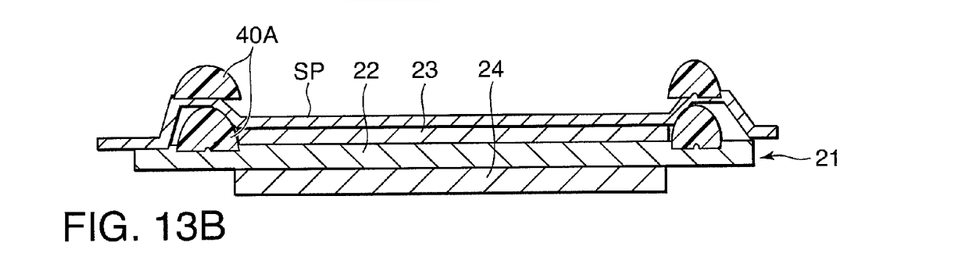

Referring to FIGS. 13A and 13B, a separator SP of 170×140 (mm) made of a polyethylene film having a thickness of 12 μm was arranged on the positive electrode side so as to cover the entire surface of the current collector 22 including the SUS. Thereafter, the seal precursor 40A made of the one-part uncured epoxy resin was applied to a position of the separator SP to be overlapped with the seal precursor 40A using the dispenser.

By laminating the bipolar electrodes 21 and the separators SP described above, a structure of the laminated body 30 in which twelve cells 26 are laminated was prepared.

Next, press molding of a bipolar battery will be described.

Figure 14:
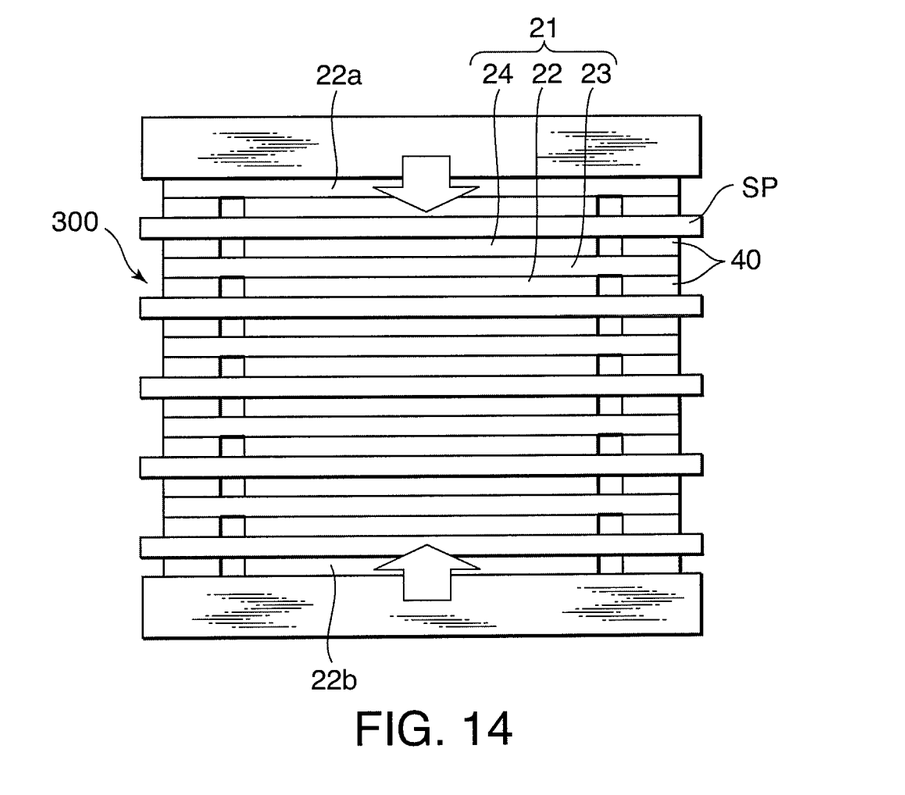
FIG. 14 is a schematic side view of a press machine showing a final formation process of a bipolar secondary battery.

Referring to FIG. 14, the seal precursors 40A were cured to obtain seal portions 40 by thermally pressing the structure of the laminated body 30 constructed as described above with a surface pressure of 1 kg/cm$^2$ (≅kPa) at 80° C. for one hour by a thermal press machine. In this way, the seal portions 40 can be pressed to a predetermined thickness and can be cured further. As a result of the above process, the laminated body 30 in which twelve layers of cells 26 were laminated was completed.

Next, packaging will be described.

By bonding three laminated bodies 30 formed by the above process to each other using conductive double-sided adhesive tapes, the three laminated bodies 30 connected in series, in other words, a battery main body 300 composed of thirty six layers of cells 26 was obtained. A positive electrode current collecting plate 101 was bonded to a positive electrode current collector 22a at one end of the battery main body 300 by a conductive double-sided adhesive tape. A negative electrode current collecting plate 102 was bonded to a negative electrode current collector 22b at another end of the battery main body 300. A surface of the positive electrode current collecting plate 101 opposite to the battery main body 300 was bonded to the inner peripheral surface of a case member 103a using a double-sided adhesive tape. Similarly, a surface of the negative electrode current collecting plate 102 opposite to the battery main body 300 was bonded to the inner peripheral surface of a case member 103b by a double-sided adhesive tape. Flange portions of the case members 103a, 103b were welded to vacuum seal the case 103 with take-out portions of the positive electrode current collecting plate 101 and the negative electrode current collecting plate 102 sandwiched between the flange portions.

By the above process, Examples #1 to #8 according to this invention relating to the bipolar secondary battery 100 and Comparative Examples #1 to #3 not according to this invention were prepared.

Any one of a butyl rubber-based conductive double-sided adhesive tape having a peel strength of 120%, an acrylic-based conductive double-sided adhesive tape having a peel strength of 100% and an epoxy adhesive having a peel strength of 90% was used for bonding between the positive electrode current collecting plate 101 and the case member 103a and between the negative electrode current collecting plate 102 and the case member 103b.

Further, any one of a butyl rubber-based conductive double-sided adhesive tape having a peel strength of 120%, an acrylic-based conductive double-sided adhesive tape having a peel strength of 100% and an epoxy adhesive having a peel strength of 90% was used for bonding between the positive electrode current collectors 22a and the negative electrode current collectors 22b between two adjacent ones of the three laminated bodies 30, between the positive electrode current collecting plate 101 and the positive electrode current collector 22a at the one end of the battery main body 300 and between the negative electrode current collecting plate 102 and the negative electrode current collector 22b at the other end of the battery main body 300. Any of the peel strengths expresses a relative peel strength in percentage when the peel strength of the acrylic-based double-sided adhesive tape is 100%.

The specification of each part of Examples #1 to #8 and Comparative Examples #1 to #3 on the peel strength is shown in TABLE-1. Note that Examples #1 to #4 correspond to the first embodiment, Example #5 corresponds to the second embodiment, Example #6 corresponds to the third embodiment, Example #7 corresponds to the fourth embodiment and Example #8 corresponds to the fifth embodiment.

TABLE 1

Figure 15:
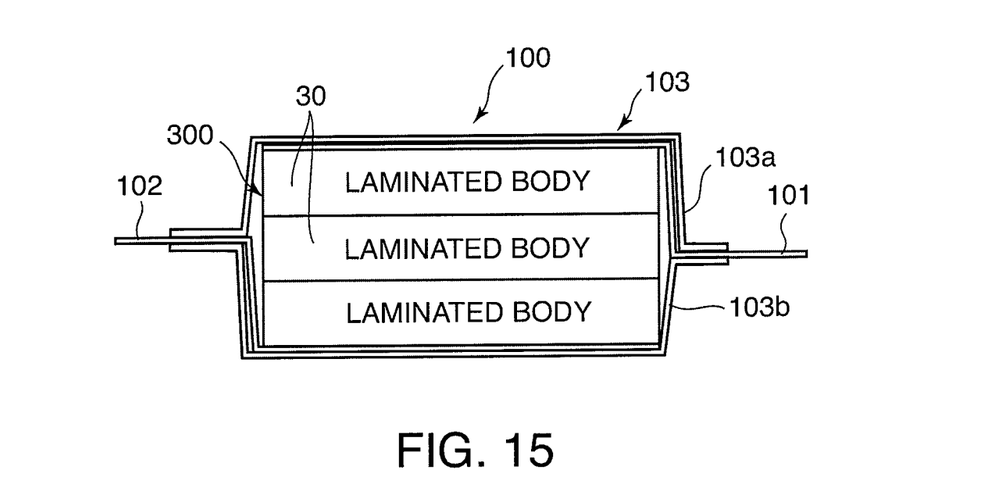
FIG. 15 is a longitudinal vertical sectional view of a bipolar secondary battery formed with no folded portion.

| Name | Case | Peel Strength (%) | | | | | Separator/ Case | Battery Shape |
|---|---|---|---|---|---|---|---|---|
| | | Positive Electrode Current Collecting Plate/Positive Electrode Current Collector | Positive Electrode Current Collector/ Negative Electrode Current Collector | Negative Eectrode Current Collecting Plate/Negative Electrode Current Collector | Positive Electrode Current Collecting Plate/Case | Negative Electrode Current Collecting Plate/Case | | |
| Comparative Example #1 | Aluminum laminated film | 100 | 100 | 100 | 90 | 90 | | FIG. 15 |
| Comparative Example #2 | Aluminum laminated film | 100 | 100 | 100 | 120 | 90 | | " |
| Comparative Example #3 | Aluminum laminated film | 100 | 100 | 100 | 90 | 120 | | " |
| Example #1 | Aluminum can | 100 | 90 | 100 | 120 | 120 | | " |
| Example #2 | Aluminum laminated film | 100 | 90 | 100 | 100 | 100 | | " |
| Example #3 | Aluminum laminated film | 100 | 120 | 120 | 120 | 120 | | " |
| Example #4 | Aluminum laminated film | 100 | 100 | 90 | 100 | 100 | | " |
| Example #5 | Aluminum laminated film | 100 | 90 | 100 | 100 | 100 | | FIG. 3 |
| Example #6 | Aluminum laminated film | 100 | 90 | 100 | 100 | 100 | | FIG. 6 |
| Example #7 | Aluminum laminated film | 100 | 90 | 100 | 100 | 100 | | FIG. 10 |
| Example #8 | Aluminum laminated film | 100 | 90 | 100 | 100 | 100 | 120 | FIGS. 16, 17 |

In Comparative Examples #1 to #3 not according to this invention, the acrylic-based conductive double-sided adhesive tape having a peel strength of 100% is used for bonding between the positive electrode current collector 22a and the negative electrode current collector 22b between the laminated bodies L constituting the battery main body 300, between the positive electrode current collecting plate 101 and the positive electrode current collector 22a at the one end of the battery main body 300 and between the negative electrode current collecting plate 102 and the negative electrode current collector 22b at the other end of the battery main body 300.

In Comparative Example #1, the epoxy adhesive having a peel strength of 90% is used for bonding between the positive electrode current collecting plate 101 and the case member 103a and between the negative electrode current collecting plate 102 and the case member 103b. In Comparative Example #2, the butyl rubber-based double-sided adhesive tape having a peel strength of 120% is used for bonding between the positive electrode current collecting plate 101 and the case member 103a and the epoxy adhesive having a peel strength of 90% is used for bonding between the negative electrode current collecting plate 102 and the case member 103b. In Comparative Example #3, the epoxy adhesive having a peel strength of 90% is used for bonding between the positive electrode current collecting plate 101 and the case member 103a and the butyl rubber-based double-sided adhesive tape having a peel strength of 120% is used for bonding between the negative electrode current collecting plate 102 and the case member 103b.

On the other hand, in Examples #1 and #2 according to this invention, the epoxy adhesive having a peel strength of 90% is used for bonding between the positive electrode current collector 22a and the negative electrode current collector 22b between the laminated bodies 30 constituting the battery main body 300 and the acrylic-based conductive double-sided adhesive tape having a peel strength of 100% is used for bonding between the positive electrode current collecting plate 101 and the positive electrode current collector 22a at the one end of the battery main body 300 and between the negative electrode current collecting plate 102 and the negative electrode current collector 22b at the other end of the battery main body 300.

In Example #1, the butyl rubber-based double-sided adhesive tape having a peel strength of 120% is used for bonding between the positive electrode current collecting plate 101 and the case member 103a and between the negative electrode current collecting plate 102 and the case member 103b.

In Example #2, the acrylic-based conductive double-sided adhesive tape having a peel strength of 100% is used for bonding between the positive electrode current collecting plate 101 and the case member 103a and between the negative electrode current collecting plate 102 and the case member 103b.

In Example #3 according to this invention, the butyl rubber-based double-sided adhesive tape having a peel strength of 120% is used for bonding between the positive electrode current collector 22a and the negative electrode current collector 22b between the laminated bodies 30 constituting the battery main body 300, the acrylic-based conductive double-sided adhesive tape having a peel strength of 100% is used for bonding between the positive electrode current collecting plate 101 and the positive electrode current collector 22a at the one end of the battery main body 300, the butyl rubber-based double-sided adhesive tape having a peel strength of 120% is used for bonding between the negative electrode current collecting plate 102 and the negative electrode current collector 22b at the other end of the battery main body 300, and the butyl rubber-based double-sided adhesive tape having a peel strength of 120% is used for bonding between the positive electrode current collecting plate 101 and the case member 103a and between the negative electrode current collecting plate 102 and the case member 103b.

In Example #4 according to this invention, the acrylic-based conductive double-sided adhesive tape having a peel strength of 100% is used for bonding between the positive electrode current collector 22a and the negative electrode current collector 22b between the laminated bodies 30 constituting the battery main body 300 and between the positive electrode current collecting plate 101 and the positive electrode current collector 22a at the one end of the battery main body 300, the epoxy adhesive having a peel strength of 90% is used for bonding between the negative electrode current collecting plate 102 and the negative electrode current collector 22b at the other end of the battery main body 300 and the acrylic-based conductive double-sided adhesive tape having a peel strength of 100% is used for bonding between the positive electrode current collecting plate 101 and the case member 103a and between the negative electrode current collecting plate 102 and the case member 103b.

In Examples #5 to #8 according to this invention, the epoxy adhesive having a peel strength of 90% is used for bonding between the positive electrode current collector 22a and the negative electrode current collector 22b between the laminated bodies 30 constituting the battery main body 300, and the acrylic-based conductive double-sided adhesive tape having a peel strength of 100% is used for bonding between the positive electrode current collecting plate 101 and the positive electrode current collector 22a at the one end of the battery main body 300, between the negative electrode current collecting plate 102 and the negative electrode current collector 22b at the other end of the battery main body 300, between the positive electrode current collecting plate 101 and the case member 103a and between the negative electrode current collecting plate 102 and the case member 103b.

Further, in Example #8 according to this invention, the separator SP of a specific cell 26 is formed to have large external dimensions, and the outer peripheral part of this separator SP is bonded to the case member 103a via the butyl rubber-based double-sided adhesive tape having a peel strength of 120%.

Next, differences in the material and the shape of the case 103 and the presence or absence of the inflator 14 will be described.

The case 103 of Example #1 is formed of an aluminum alloy can and the cases 103 of Comparative Examples #1 to #3 and Examples #2 to #7 are formed of an aluminum laminated film.

The cases 103 of the bipolar secondary batteries 100 of Examples #1 to #4 and #8 and Comparative Examples #1 to #3 are formed to have a shape shown in FIG. 15. This is basically equivalent to the case 103 of the first embodiment.

The case 103 of the bipolar secondary battery 100 of Example #5 is formed to have a shape shown in FIG. 3. That is, a folded portion 11 projecting in the lamination direction of the cells 26 and including one crest portion is provided at each of both ends of the top surface of one case member 103a.

The bipolar secondary battery 100 of Example #6 is formed to have a shape shown in FIGS. 6 and 7, or in other words the case 103 as in Example #5 is used and a folded portion 12 is formed inside a folded portion 11.

The case 103 of Example #7 comprises an inflator 14 in the case 103 as shown in FIG. 10 and comprises a controller 15 outside the case 103.

The inventors connected pipes for feeding air under pressure to the cases 103 of Comparative Examples #1 to #3 and the cases 103 of Examples #1 to #6, fed air under pressure while measuring an electrical resistance between the positive electrode current collecting plate 101 and the negative electrode current collecting plate 102 and measured internal pressures of the cases 103 when the electrical resistance increased. Concerning Example #7, an internal pressure of the case 103 when an electrical resistance between the positive electrode current collecting plate 101 and the negative electrode current collecting plate 102 suddenly increased was measured in a state where the inflator 14 arranged in the case 103 was actuated.

Measurement results for Comparative Examples #1 to #3 and Examples #1 to #6 and #8 are shown in TABLE-2.

collecting plate 102 and the negative electrode current collector 22b at the other end of the battery main body 300 and the peel strength between the positive electrode current collector 22a and the negative electrode current collector 22b between the laminated bodies 30 constituting the battery main body 300. That is to say, the bonded part having a weakest peel strength is present between the positive electrode current collecting plate 101 and the negative electrode current collecting plate 102. Therefore, if the case 103 extends, peeling occurs somewhere between the positive electrode current collecting plate 101 and the negative electrode current collecting plate 102 and a short-circuit current in the bipolar secondary battery 100 is interrupted.

It can be understood from the results of Examples #2 to #4 that at least one of the peel strength between the positive electrode current collecting plate 101 and the positive electrode current collector 22a at the one end of the battery main body 300, the peel strength between the negative electrode current collecting plate 102 and the negative electrode current collector 22b at the other end of the battery main

TABLE 2

| Item | Comparative Example #1 | Comparative Example #2 | Comparative Example #3 | Example #1 | Example #2 | Example #3 | Example #4 | Example #5 | Example #6 | Example #8 |
|---|---|---|---|---|---|---|---|---|---|---|
| Resistance Sudden Increase | Absent | Absent | Absent | Present | Present | Present | Present | Present | Present | Present |
| Internal Pressure (kg/cm$^2$) ($\cong$kPa) | | | | 12 (Case Broken) | 8 | 9 | 8 | 4 | 1 | 8 |
| Peel Position | Negative Current Collecting Plate/Case | Negative Current Collecting Plate/Case | Positive Current Collecting Plate/Case | Positive Current Collector/ Negative Current Collector | Positive Current Collector/ Negative Current Collector | Positive Current Collecting Plate/ Positive Current Collector | Positive Current Collector/ Negative Current Collector | Positive Current Collector/ Negative Current Collector | Positive Current Collector/ Negative Current Collector | Positive Current Collector/ Negative Current Collector |

With reference to TABLE-1, in Comparative Examples #1 to #3 not according to this invention, the peel strength between the positive electrode current collecting plate 101 and the case 103 and the peel strength between the negative electrode current collecting plate 102 and the case 103 are lower than any of the peel strength between the positive electrode current collecting plate 101 and the positive electrode current collector 22a at the one end of the battery main body 300 or the peel strength between the negative electrode current collecting plate 102 and the negative electrode current collector 22b at the other end of the battery main body 300 or the peel strength between the positive electrode current collector 22a and the negative electrode current collector 22b between the laminated bodies 30. Thus, peeling occurs between the positive electrode current collecting plate 101 and the case 103 or between the negative electrode current collecting plate 102 and the case 103, and a short-circuit current in the bipolar secondary battery 100 cannot be interrupted.

In Examples #1 to #6 and #8 according to this invention, the peel strength between the positive electrode current collecting plate 101 and the case member 103a and the peel strength between the negative electrode current collecting plate 102 and the case member 103b are higher than at least one of the peel strength between the positive electrode current collecting plate 101 and the positive electrode current collector 22a at the one end of the battery main body 300, the peel strength between the negative electrode current body 300 and the peel strength between the positive electrode current collector 22a and the negative electrode current collector 22b between the laminated bodies 30 has to be below the peel strength between the positive electrode current collecting plate 101 and the case 103 and the peel strength between the negative electrode current collecting plate 102 and the case 103. It is understood that a current is interrupted by increasing the internal pressure of the case 103 in this way.

The comparison of Example #1 and Examples #2 with #6 and #8 shows that the resistance suddenly increased at an internal pressure of 12 kg/cm$^2$ ($\cong$kPa), but simultaneously the case 103 was broken due to the internal pressure in Example #1. From this fact, a possibility of breaking the case 103 due to the internal pressure is thought to be high when the case 103 is not deformed even if the internal pressure reaches 10 kg/cm$^2$ ($\cong$kPa) or higher.

The comparison of Examples #2 to #4 and #8 with Examples #5, #6 shows that the case 103 is not formed with the folded portion 11 corresponding to an allowance for elongation for a volume change in Examples #2 to #4 and #8. In such cases, it is not possible to interrupt power unless a relatively large internal pressure is applied.

Further, it is understood from the comparison of Example #5 with Example #6 that a current can be interrupted by a smaller internal pressure by forming the folded portion 11 and the folded portion 12 than in the case of forming only the folded portion 11.

Concerning Example 7 not shown in TABLE-2, the electrical resistance between the positive electrode current collecting plate 101 and the negative electrode current collecting plate 102 suddenly increased as in other Examples #1 to #6 when the controller 15 actuated the inflator 14 to apply an internal pressure of 5 kg/cm$^2$ ($\approx$kPa) to the case 103. Accordingly, it was confirmed that an internal current of the bipolar secondary battery 100 could be interrupted.

It was confirmed from Examples #1 to #8 that the short-circuit current could be easily interrupted by using the case 103 made of the laminated film such as an aluminum laminated film.

The contents of Tokugan 2010-115113, with a filing date of May 19, 2010 in Japan, are hereby incorporated by reference.

Although the invention has been described above with reference to certain embodiments, the invention is not limited to the embodiments described above. Modifications and variations of the embodiments described above will occur to those skilled in the art, within the scope of the claims.

For example, this invention is also applicable to any bipolar secondary battery including lithium-ion batteries.

In each of the embodiments described above, the sealed case 103 is obtained by welding the case members 103a, 103b made of aluminum cans or aluminum laminated films to each other. However, the case 103 may have any structure and may be made of any material as long as the case 103 has a property to extend according to a temperature increase.

INDUSTRIAL FIELD OF APPLICATION

As described above, it is possible according to this invention to interrupt the flow of a large amount of current into a bipolar secondary battery. This produces a preferable effect in protecting a secondary battery of an electric vehicle.

The embodiments of this invention in which an exclusive property or privilege is claimed are defined as follows:

The invention claimed is:

1. A bipolar secondary battery, comprising:
   a battery main body including one laminated body or a plurality of laminated bodies connected in series, the laminated body comprising a plurality of bipolar electrodes and electrolyte layers laminated alternately in a lamination direction, the bipolar electrode comprising a plate-like current collector, a positive electrode active material layer arranged on one surface of the current collector and a negative electrode active material layer arranged on another surface of the current collector;
   a case formed of a sheet-like case member and housing the battery main body;
   a positive electrode current collecting plate having one surface joined to an inner peripheral surface of the case and another surface joined to one end of the battery main body, the positive electrode current collecting plate extending to an outside of the case;
   a negative electrode current collecting plate having one surface joined to the inner peripheral surface of the case and another surface joined to another end of the battery main body, the negative electrode current collecting plate extending to an outside of the case; and
   a cutoff mechanism configured to cut off an electrical connection between the positive electrode current collecting plate and the negative electrode current collecting plate by exerting a tensile load there-between in response to an expansion deformation of the case,
   wherein the positive electrode current collecting plate and the negative electrode current collecting plate are on opposite ends of the battery main body in the lamination direction, and
   wherein the cutoff mechanism comprises a folded portion constituted by the case member bent in inward and outward directions of the case and configured to unfold and expand the case primarily in the lamination direction according to a gas pressure increase in the case.

2. The bipolar secondary battery as defined in claim 1, wherein the cutoff mechanism is configured by setting a peel strength between the positive electrode current collecting plate and the inner peripheral surface of the case and a peel strength between the negative electrode current collecting plate and the inner peripheral surface of the case to be higher than at least one of a peel strength between the positive electrode current collecting plate and the battery main body, a peel strength between the negative electrode current collecting plate and the battery main body and a peel strength between the plurality of laminated bodies.

3. The bipolar secondary battery as defined in claim 1, wherein the inner peripheral surface of the case and the positive electrode current collecting plate, the inner peripheral surface of the case and the negative electrode current collecting plate, the positive electrode current collecting plate and the one end of the battery main body and the negative electrode current collecting plate and the another end of the battery main body are respectively joined by bonding.

4. The bipolar secondary battery as defined in claim 1, wherein either one of the positive electrode current collecting plate and the negative electrode current collecting plate comprises a folded portion constituted by the positive electrode current collecting plate or the negative electrode current collecting plate bent in the inward and outward directions of the case.

5. The bipolar secondary battery as defined in claim 1, wherein the case is formed of a laminated film in which a metal foil is covered with a synthetic resin film.

6. The bipolar secondary battery as defined in claim 1, wherein the electrolyte layers contain an organic solvent that gasifies with an increase in temperature.

7. The bipolar secondary battery as defined in claim 1, further comprising an inflator that produces a gas inside the case in response to a command input from outside the case.

* * * * *